United States Patent [19]

Lu

[11] Patent Number: 4,988,976

[45] Date of Patent: Jan. 29, 1991

[54] HEAD-UP DISPLAY WITH MAGNETIC FIELD SPEED DETECTING MEANS

[76] Inventor: Hsing-Tseng Lu, 3rd Fl., No. 14, Lane 96, Chinhsing Rd. Chinmei District, Taipei, Taiwan

[21] Appl. No.: 403,756

[22] Filed: Sep. 6, 1989

[51] Int. Cl.⁵ .............................................. G02B 27/10
[52] U.S. Cl. .................................. 340/461; 350/174; 340/705; 324/174
[58] Field of Search ................ 350/174; 340/705, 980, 340/461; 324/174

[56] References Cited

U.S. PATENT DOCUMENTS

| | | | |
|---|---|---|---|
| 4,831,366 | 5/1989 | Iino | 340/461 |
| 4,897,715 | 1/1990 | Beamon, III | 340/705 |
| 4,902,116 | 2/1990 | Ellis | 350/174 |
| 4,925,272 | 5/1990 | Ohshima et al. | 340/705 |

Primary Examiner—Jon W. Henry
Attorney, Agent, or Firm—Ladas & Parry

[57] ABSTRACT

A head-up display (HUD) for automobile or motorcycle use. By using a vacuum fluorscent display and through the double refraction effected by a special lens, the desired instant information values such the speed, time, etc. are enlarged and projected and then accurately displayed on the windshield of an automobile or on the safety helmet worn by a motorcycle rider for fast direct readout. The present invention further comprises an electromagnetic inducer disposed on the tire which correctly calculates the speed of the vehicle regardless of the tire size.

9 Claims, 10 Drawing Sheets

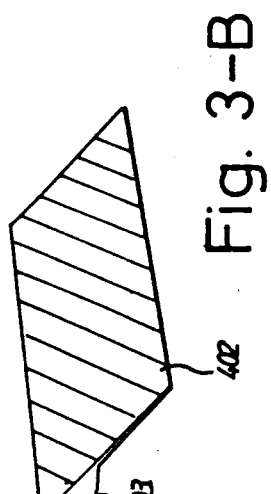
Fig. 3-B
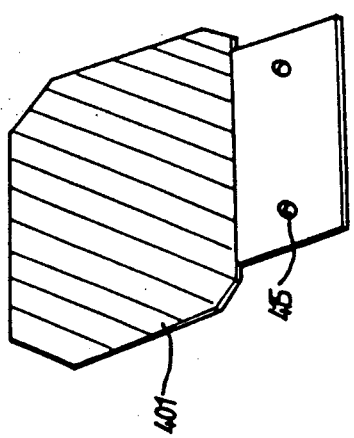
Fig. 3-C
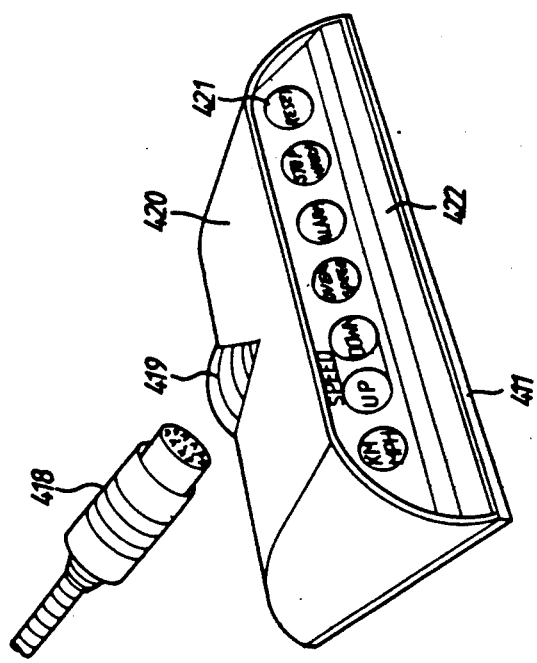
Fig. 3-A

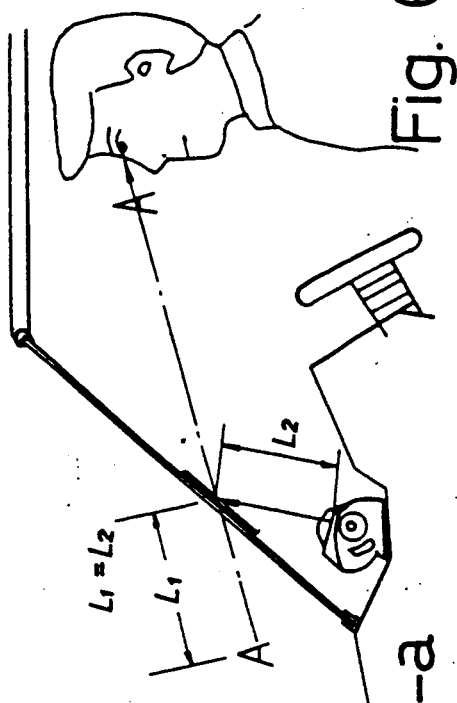
Fig. 6-A
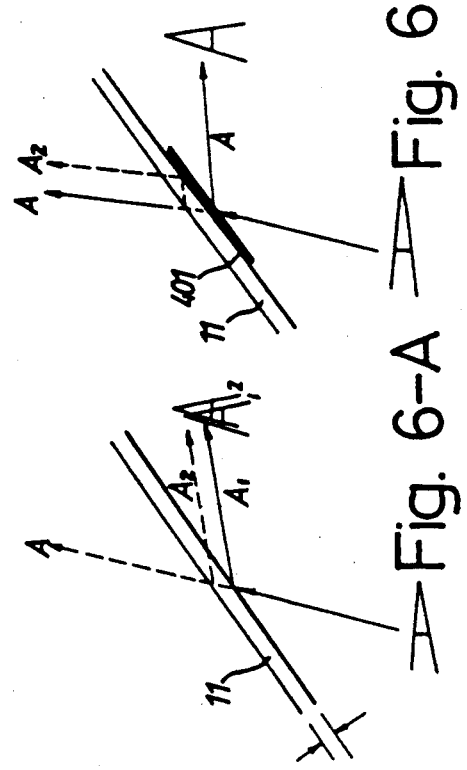
Fig. 6-A-a
Fig. 6-B
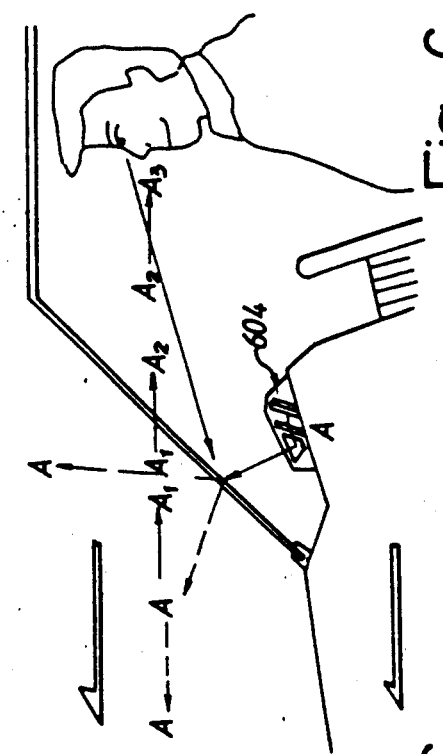
Fig. 6-C
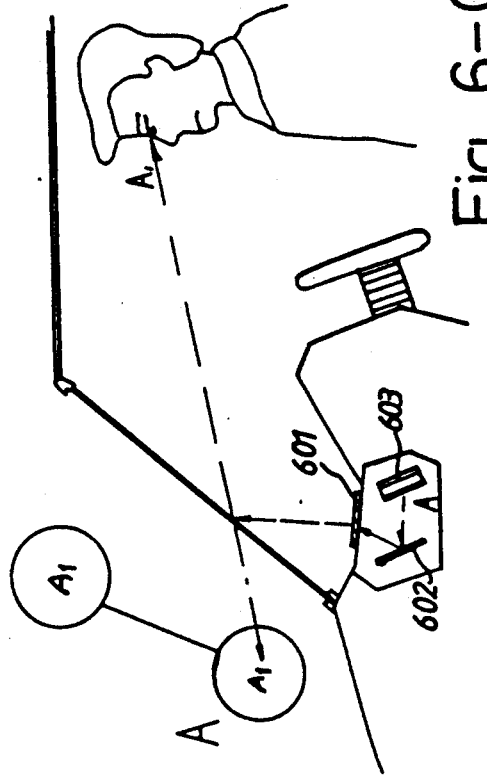
Fig. 6-D

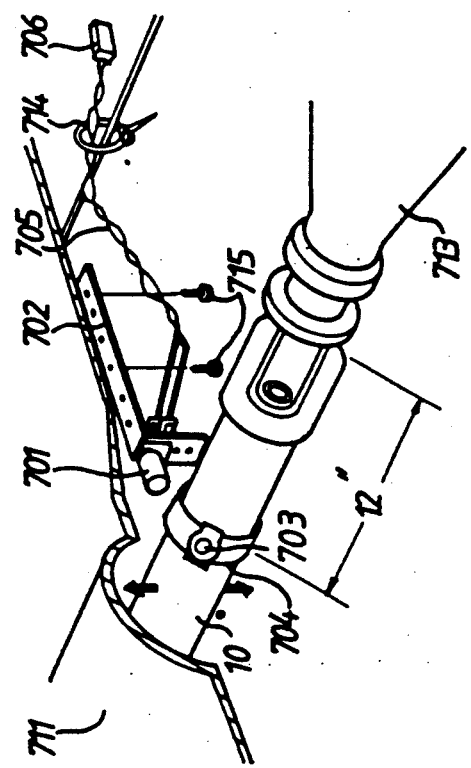
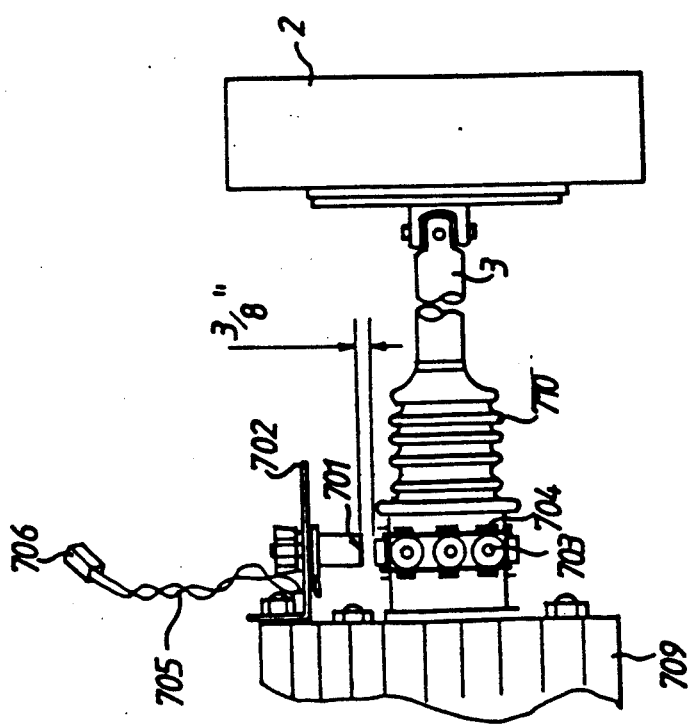
Fig. 7-B
Fig. 7-A

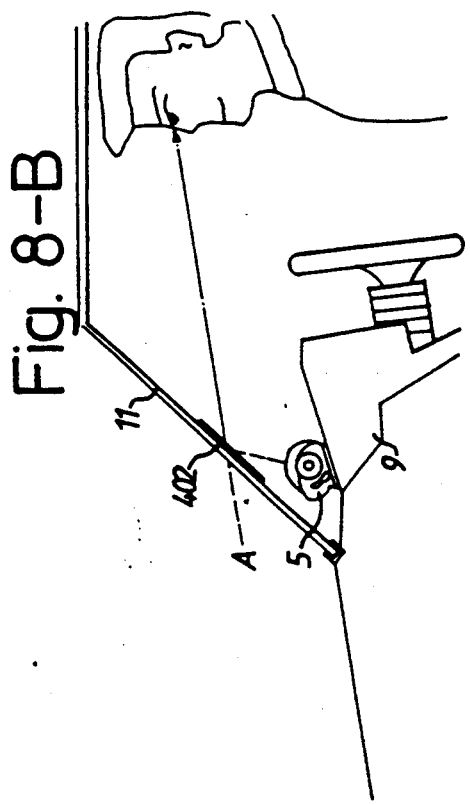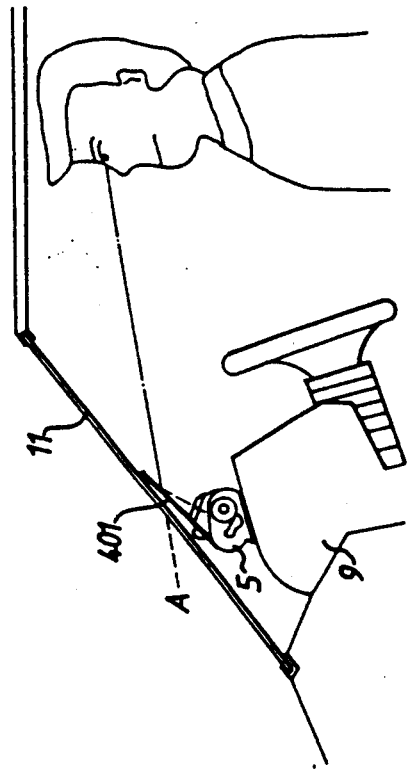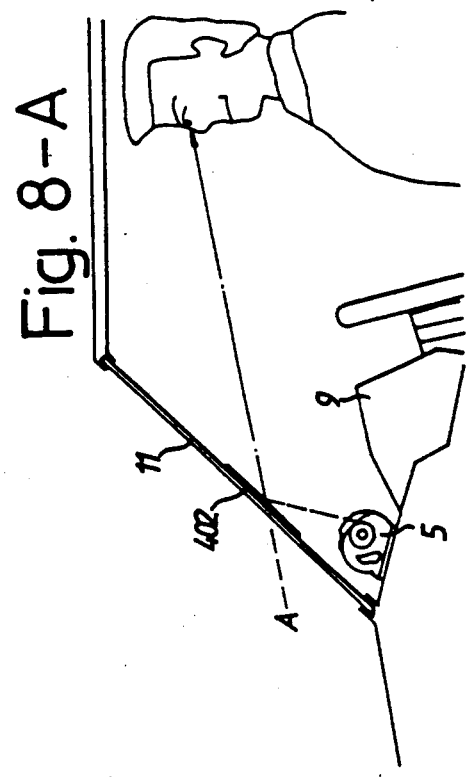

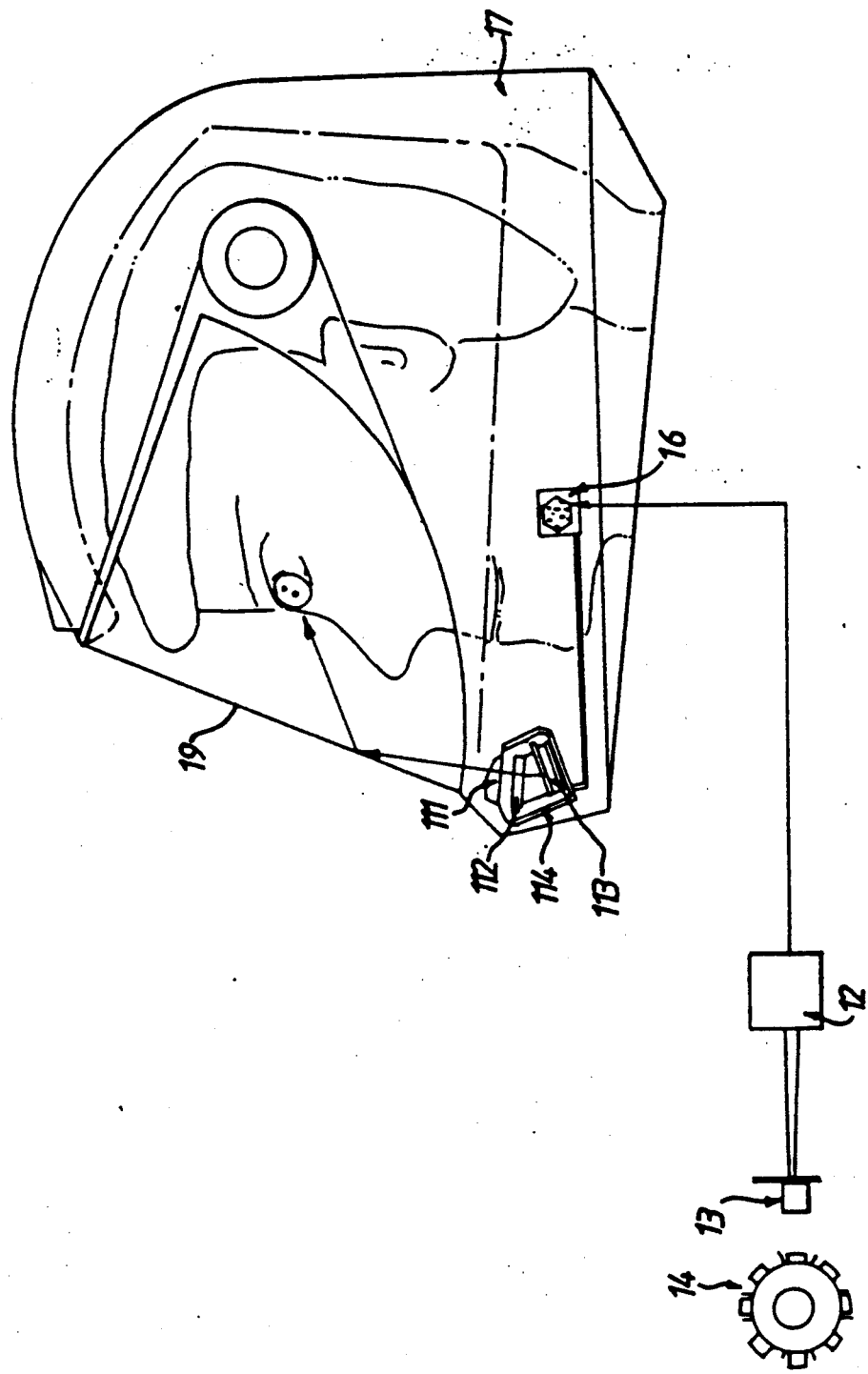

HEAD-UP DISPLAY WITH MAGNETIC FIELD SPEED DETECTING MEANS

BACKGROUND OF THE INVENTION

Since automobiles in general travel at considerably high speed, every driver needs to direct his effort at driving the car without having his attention diverted otherwise. When a driver wants to know such instant information values as speed, time, rpm, fuel level, temperature, humidity, etc., hazardous accidents may result if he has his eyesight off the course. Therefore, various head-up display designs have been introduced. In know head-up displays for automobiles, some will exhibit the so-called double images which produce the image deviation due to the projection on the thick transparent glass facing, others will result in distortion of the displayed images due to the inclined reflective surface (when the principle of reflection is used), still others will cause shift in the image (direct projection) due to the relative motion when an automobile is accelerating (according to the Doppler effect), thus leading to blindness.

SUMMARY OF THE INVENTION

The present invention is intended to provide a head-up display for automobiles which, by using a high brightness vacuum fluorescent display and through the double refraction effected by a special mirror, correctly displays required instant information values, such as speed and time, in the central portion on the windshield of an automobile where the data are easily visible to the driver for his reference. The head-up display of the present invention has been tested by leading automobile manufacturers. With the present head-up display, the data displayed can be seen faster (about 0.33 second) than known head-up displays. With the known head-up displays, in addition to the annoying problems resulted from double images, the Doppler effect, etc., it takes about 0.46 second for a driver to obtain a reading (because the data are not displayed in the center).

The present invention may also provide a head-up display for use with motorcycles wherein the required data are transmitted through a wired or wireless converter and then displayed on the transparent windshield shade of the rider's safety helmet.

An additional object of the present invention is to provide correct speed calculation regardless of the tire size, by using a unique electromagnetic inducer.

BRIEF DESCRIPTION OF THE DRAWINGS

FIG. 3A is a view showing the construction of the function control box used in the head-up display of the present invention.

FIG. 3B is a view showing the transparent displaying film used in the head-up display of the present invention.

FIG. 3C is a view showing the transparent delaying board used in the head-up display of the present invention.

FIGS. 6A, 6Aa, 6B, 6C and 6 D views illustrating the refractive process in which the image is formed.

FIGS. 7A and 7B are a views showing the arrangement of the electromagnetic inducer of the present invention.

FIGS. 8A–8D are a schematic views showing an alternative way of projection used in the present invention.

FIG. 10 is a view showing, in detail, the various components of the present invention.

DETAILED DESCRIPTION OF THE PREFERRED EMBODIMENTS

Figure 1:
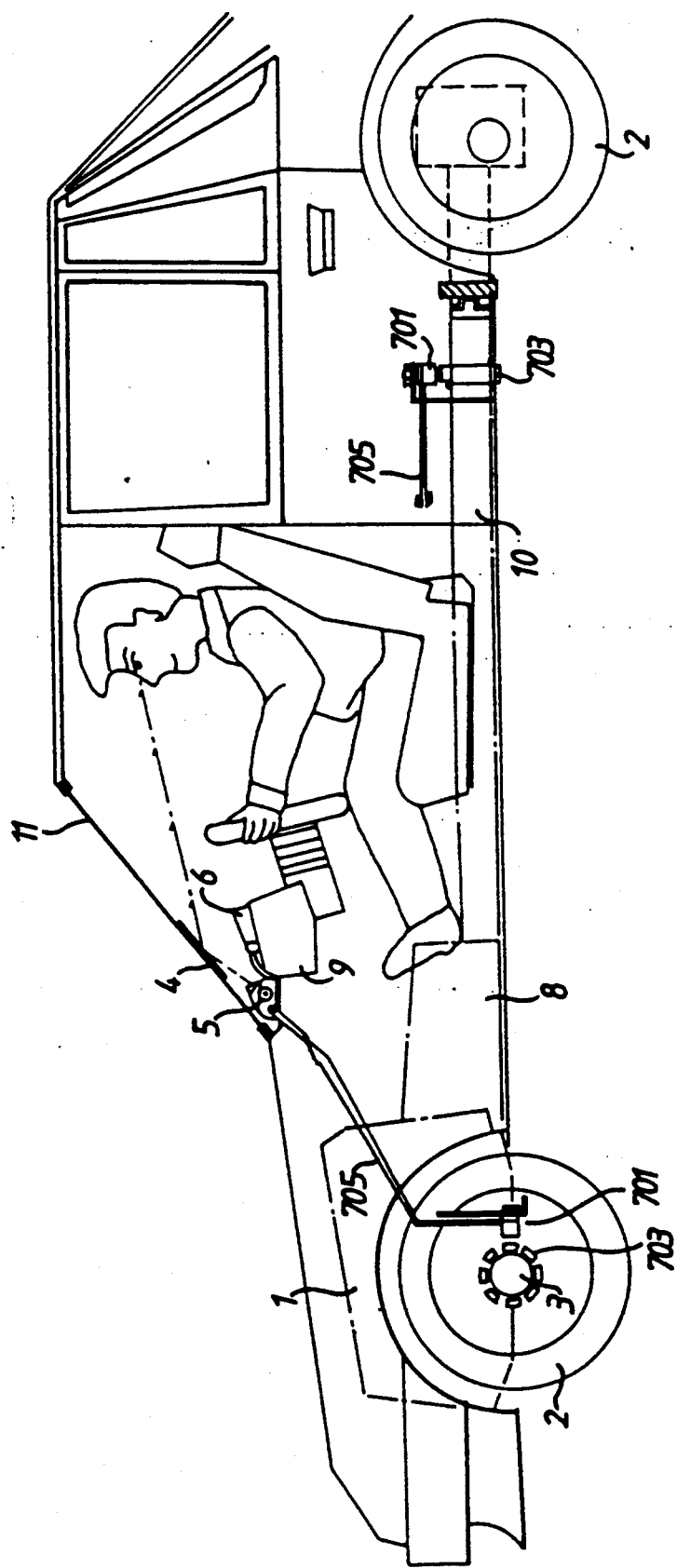
FIG. 1 is a view showing the overall arrangement of the head-up display according to the present invention.
Figure 2:
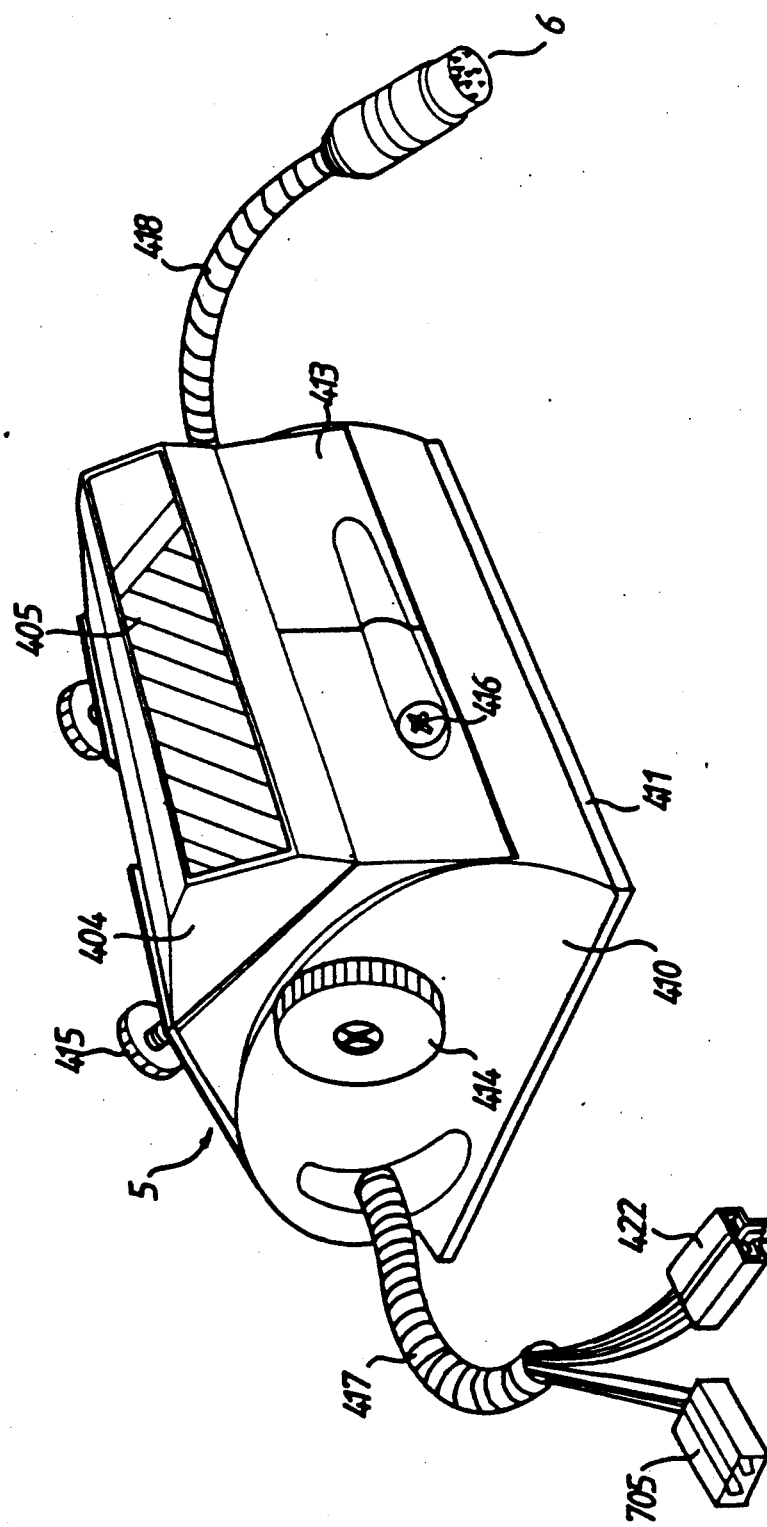
FIG. 2 is a view showing the construction of the projection display used in the head-up display of the present invention.
Figure 4:
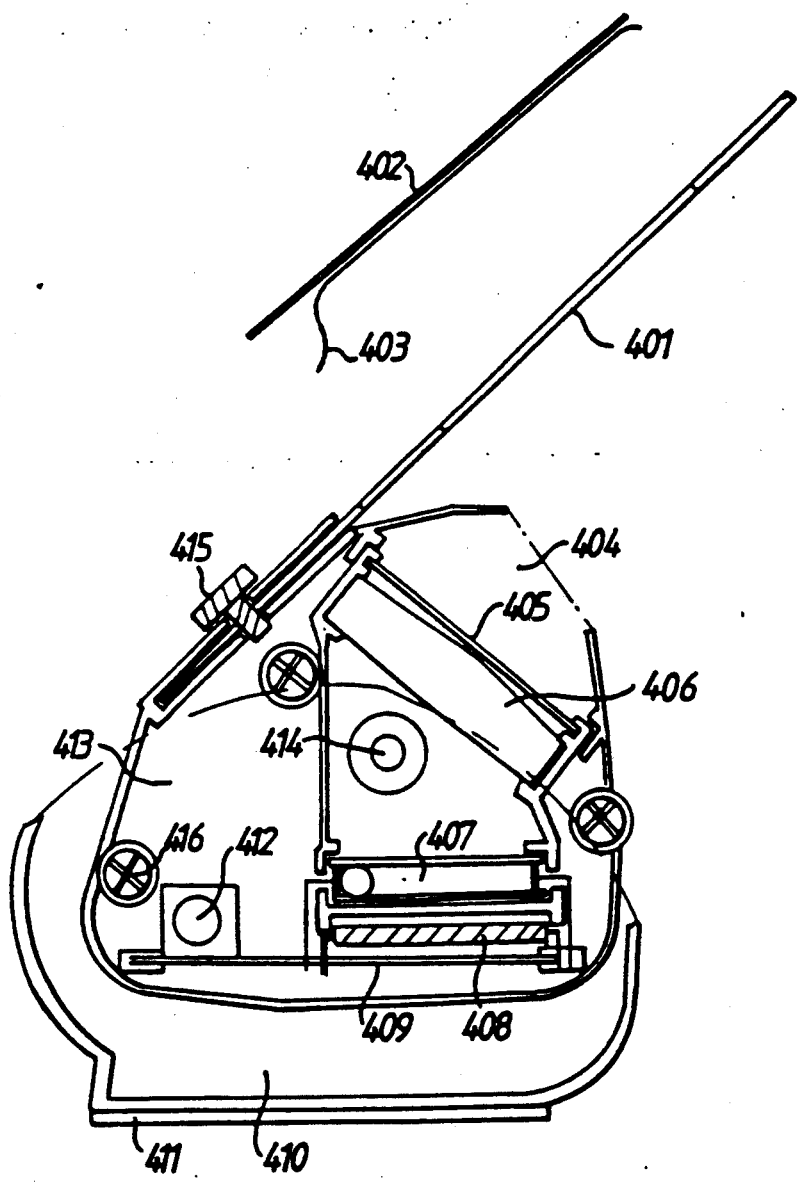
FIG. 4 is a view showing the assembly of various components used in the head-up display of the present invention.

Referring to FIG. 1, the head-up display of the present invention comprises mainly: an electromagnetic inducer (701), a plurality of magnetic force generators (703) secured on the front wheel transmission shaft (3) (or the rear wheel transmission shaft (10)) of the wheels (2), the electromagnetic inducer (701) serving to detect magnetic field from the magnetic force generators (703) and electromagnetic signals being transmitted via a signal line (705) to a counting circuit device provided in a projection display (5), said counting circuit device comprising a 8 bit, 4k microprocessor IC (408) and a counting circuit device circuit board (409) comprising an interface circuit, as shown in detail in FIG. 4; the projection display (5) being connected via a control function line (418) as shown in FIG. 2 to a function control box (6), through a transmissive lens (406) of specific magnification as shown in FIG. 4, instant information values such as speed being projected by the projection display (5) on a light colored transparent plastic film (4) adhered to the windshield (11) of a car such that the instant information values are correctly displayed.

FIG. 2 shows the construction of the projection display (5) of the present invention comprising an array of power and signal lines (417) including a signal line (705) representing the speed of the car and a power line (422) supplying power (such as the car's 12 V DC) for the display; a control function line (418) leading to the function control box (6); a colored plastic film (405) which has a transmissivity of only 70% being disposed on the upper end for transmitting information images coming from a fluorescent display lamp (407) as shown in FIG. 4 and refracted through the transmissive lens (406) of specific magnification disposed within the projection display as shown in FIG. 4 so as to prevent exposure to light during day time; a dark colored light shade (404) disposed on the upper end of the projection display (5) and engaged with said colored plastic film (405) to prevent light scattering of the fluorescent display lamp and exposure to light during day time; a display base (410) with the underside having strong double-sided adhesive (411) and securing screws for securing at an appropriate position adjacent the dashboard in the car; a housing (413); an angle adjustment knob (414) for adjusting the angles of the housing (413) in the front, rear, up, and down directions for correct projection; a pair of reflective board securing screws and threaded holes therefor (415) for securing a displaying board (401) as shown in FIG. 4; and a display securing screw (416) for securing the head-up display.

FIG. 3-A shows the construction of the function control box (6). It can seen in FIG. 3-A, the function control box (6) leads to the projection display (5) via the control function line (418) for transferring the control signal to the microprocessor IC (408) of the counter circuit.

A socket (419) is provided for receiving the control function line cord (418) and a housing (420) is also provided.

Also provided are a control panel (421) comprising touch control keys for setting the contents of the informations to be displayed and a base (422) with the underside thereof having strong double-sided adhesive (411) for securing purpose.

FIG. 3-B shows a light colored transparent displaying film (402) having coated with hydrogel (403) for preventing projection on the windshield resulting in double images and the interference by the light rays coming from outside the car. FIG. 3-C shows a light colored transparent delaying board (401) which is relatively thin such that double images are not likely to occur and that the interfering light rays coming outside the car can be reflected, the lower end thereof being provided with threaded holes (415) for securing purpose. The transparent displaying board (401) and the displaying film (402) can be shifted depending on the model of the car and the preference of the driver as shown in FIG. 8.

FIG. 4 shows the assembly of the head-up display of the present invention wherein a counting circuit device comprises a microprocessor IC (408) and a circuit board (409) for displaying the instant information values such as speed, rpm, fuel level, time, temperature, etc. which will be first displayed on, for example, a self-exciting type vacuum fluorescent display (VFD) (407), then distinctly refracted by a transmissive lens (406) to pass through the colored film (405), and precisely displayed on the light colored transparent film (4) on the car's windshield (11); an angle adjustment knob (414) for adjusting the angle of the display housing (413) in the front, rear, up, and down directions so as to accommodate various car models, different inclination angles, and the profiles of different types of dashboards, thus to obtain an accurate projection.

Figure 5:
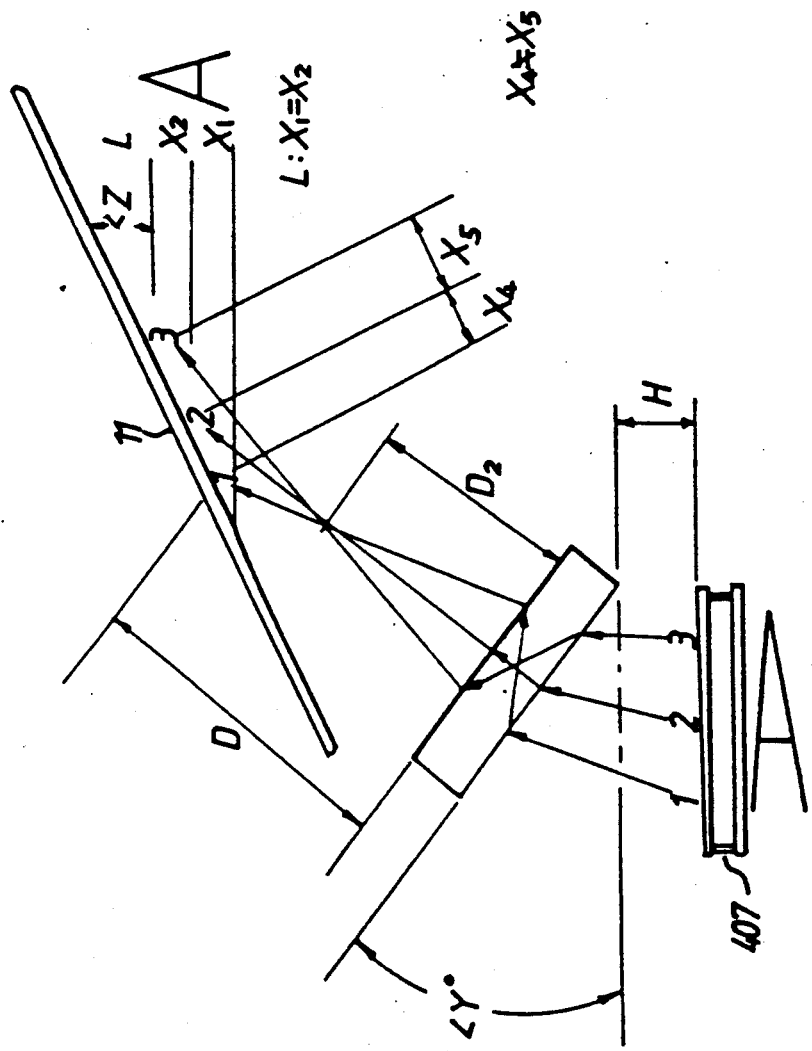
FIG. 5 is a view illustrating the double refraction principle according to which the head-up display of the present, invention functions.

FIG. 5 illustrates the double refraction principle according to which the head-up display (HUD) of the present invention functions. With the HUD of the present invention, a fluorescent display is used for the purposes of magnifying and projecting the image by means of the double refraction through a special lens (406), comprising the main components:

(1) A fluorescent display (407) which is a selfexciting type VFD lamp has a brightness of 800 lux (FtL) that is brighter than ordinary light emitting devices for the electronic instruments used in the automobiles. The super high brightness is necessary for the display because the light rays are projected on an area exposed to the sunlight (i.e., on the car's windshield).

(2) A transmissive lens (406) of equal magnifications or one of inequal magnifications is used but the focal axis thereof must be at a particular angle such that the displayed patterns on the light emitting device can be projected on a slant-surfaced object to form into a three-dimensional image. Therefore, the lens must be selected with special considerations regarding the curvature and the focal length, or distortion and deformation of the image will result.

For correct projection, the components and the conditions for the actual arrangement are as follows:

(1) A transmissive lens (406) which is a composite lens with different magnifications and focal lengths serves the follow functions:
   1. to control the sizes (the magnification times) of the characters;
   2. to have different refractive angles with different magnifications;
   3. to have an incident plane which is minimal at a particular magnification and inclination angle (to prevent the exposure effect by the incident sunlight) for the reason that exposure to light is easier for a smaller projection opening;

(2) The projection distance (D): under the double refraction effect, this distance (D) does not cause the projected image to be enlarged or reduced when the base is displaced.

(3) The imaging angle of inclination (angle Z): this imaging angle of inclination is the same as the projection angle of inclination Y (when the lens (406) is of equal radian angle), i.e., angle Z=angle Y.

(4) The fluorescent display (407): this is a selfexciting VFD lamp having a brightness of at least 600 lux.

(5) The projection angle of inclination (angle Y) controls the shape of the characters when the image is formed. The characters appear to be in vertical, three dimensional shape when the image is formed on a slant plane within a particular angle.

(6) The height (H) (the projection distance):
   1. The characters in the image are controlled to be inclined or vertical. It is possible to have a vertical image when the image is formed on a slant reflective surface within a particular distance.
   2. The shapes of the projected characters are controlled after the image is formed.

This distance H (height) must satisfy the magnification of the lens (406) particular value.

When $X1=X2$, the characters are vertically shaped. But for X4 and X5, it requires that $X4<X5$. If $X4=X5$, the image formed is inclined.

In the above discussion, X1 is the distance from the mid point to the upper portion of the displayed character (i.e., "A" in the embodiment) which has been formed after being reflected by the windshield (i.e., the reflective glass) of the car and X2 is the distance from the mid point to the lower portion thereof while X4 is the distance from the mid point to the lower portion of the character as seen in the direction vertical to the windshield and X5 is the distance from the mid point to the upper portion thereof in the same direction.

L is the distance between given points (1), (2), and (3) of the character A.

By means of the double refraction effect of the present invention, the image (A) displayed horizontally on a fluorescent display (407) can be converted into a vertical image through refraction.

FIG. 6 shows schematically the image formed through refraction for correct projection as well as the reflective and direct projections in the known techniques. FIG. 6-A shows the double images resulted due to the thickness of the windshield. FIG. 6 - A - a shows that the double images can be illuminated by a light colored transparent displaying board (401) adhered on the windshield. FIG. 6-B shows the correct projection according to the present invention wherein the distance L2 from the projection display to the transparent displaying board is the same as the distance L1 from the imaginary image to the transparent displaying board with the imaginary image of "A" being outside the window to be in line with the eyesight. FIG. 6 - C is a schematic view showing the reflective projection used in the known technique wherein the information value (A) projected from the fluorescent lamp (603) is reflected by a planar reflective mirror (602) and then refracted through the curved faces of a concave lens (601), the projection thereof being deformed due to the inclination of the curved windshield. FIG. 6-D is a schematic view showing the direct projection used in the known technique wherein the displacement of the car results in relative motion (the Doppler effect) while the car is speeding up such that the image projected from the direct projector (604) is displaced, thus leading to blindness.

FIG. 7 shows the arrangement of the electromagnetic inducer of the present invention which is suitable for the adjustable speedometer. In general, different gear mechanisms are used in the generators of the speedometer for cars of different makes and models. Moreover, there are tires of many different sizes and, in general, the same tire will give different speed indications on the speedometer before and after use. Further, conventional speedometers function by magnetic winding of a spring, thus resulting in substantial errors such that it is rather difficult to make corrections.

The principle in the design of the electromagnetic inducer of the present invention is as follows: By means of the magnetic field principle, the electromagnetic inducer (701) is formed with coils and a plurality of magnetic force generators (703) are made with a casing of an alloy with an inner (permanent) magnet, the signal generated thereby is converted to a signal in stable form through the interface circuit of the counting circuit device and then the signal and the frequency between the sizes of the tires are read out by the microprocessor IC (408) according to the integration principle, thus to indicate the speed of the car. For example, 50 Hz represents a 13" (192 cm) tire and 60 Hz, a 14" (198 cm) tire. The speed is calculated by using 100 Km as the reference and then the reference data are input to the IC such that the speed can be indicated with the frequency which represents the size of the tire. Since the final ratio of the front wheel transmission (FIG. 7-A) to the rear wheel transmission (FIG. 7-B) is 1:4, eight magnetic force generators (703) are uses on the front wheel transmission automobiles and two will suffice for cars of the rear wheel transmission type. The speed can be indicated for cars with tires of different sizes by simply adjusting the frequency of the microprocessor IC. When a display time of 1/6 or ⅛ second is input to the display, the display can be caused to function synchronously with the original instrument.

FIG. 8 is a schematic view showing an alternative way of projection used in the present invention. The distance from the dashboard to the windshield is varied with different car models. In the present invention, correctly projected image of the instant information values can be obtained by adjusting the projection display (5). FIGS. 8-A and 8-B show the adjustment of the light colored transparent displaying film (402) which is adhered on the windhshield (11) while FIGS. 8-C and 8-D show the adjustment of the the light colored transparent displaying board (401) without the transparent displaying film (402).

The same principle of the present invention used in the head-up display for automobiles is suitable for use in the head-up display for motorcycles wherein the instant information values such as speed can be transmitted, in wired or wireless manner, to the transparent shade of the safety helmet for direct readout.

Figure 9:
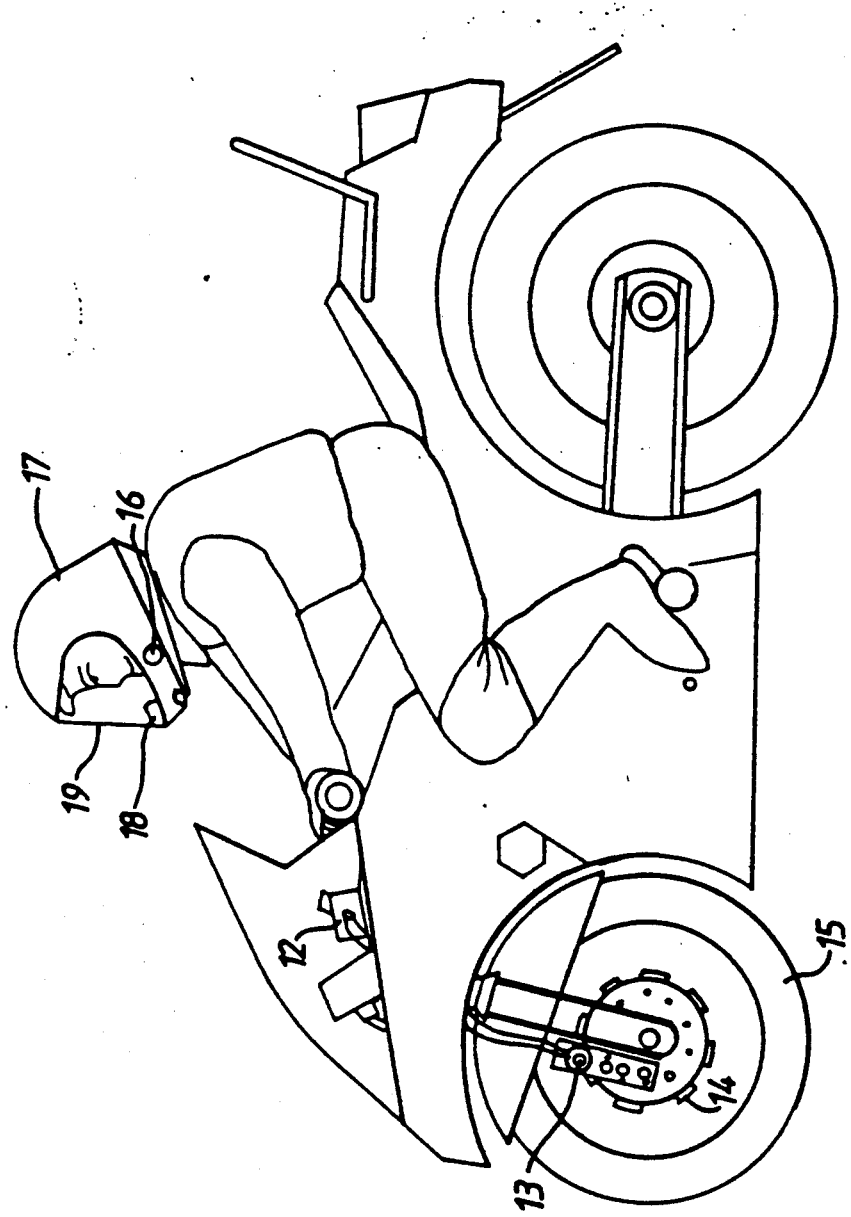
FIG. 9 is an overall arrangement of the head-up display of the present invention for use with a motorcycle.

FIG. 9 is an overall arrangement of the head-up display for a motorcycle wherein the magnetic field signal from the magnetic force generator (14) is sensed by the electromagnetic inducer (13) provided on a tire (15). This magnetic signal which represents the speed of the motorcycle is transmitted (in wired or wireless manner) to a signal receiver (16) on the helmet (17) via a signal converter (12) and then projected on the shade (19) of the safety helmet through a mini type display (18) (comprising counting circuit device not shown).

It can be seen from the detailed construction as shown in FIG. 10, the electromagnetic signal representing the speed of the motorcycle, after having been transmitted, in wired or wireless manner, to the signal receiver (16) on the helmet through the signal converter (12), is calculated into information value representing the speed to be displayed on a mini type fluorescent display (113) and then refracted by a refractive lens (112) having a curvature different from that used in automobiles and correctly projected on the transparent shade (19) of the helmet through the projection opening (111) of the display. Double images are not likely to occur because of the very thin shade such that no transparent displaying board is necessary as in the case with automobiles. In this way, a rider is enabled to read the instant information values such as the speed directly on the transparent shade of the helmet without having to divert his eyesight off the course so as to insure riding safety.

I claim:

1. A vehicle head-up display for correctly displaying instant information values at an area visible to the driver in the central portion on the windshield of a vehicle, said display comprising:

an electromagnetic inducer for detecting the changes of magnetic field generated by a plurality of magnetic force generators so as to sense an electromagnetic signal;

the magnetic force generators secured on the wheel transmission shaft of the wheels for measuring the speed of the vehicle in conjunction with the sensing by the electromagnetic inducer;

a counting circuit device comprising microprocessor IC and an interface circuit, which receives the electromagnetic signal via a signal line so as to calculate the speed of the vehicle;

a projection display comprising a transmissive lens of a particular magnification, a fluorescent display lamp, a colored film having a transmissivity of only 70%, a dark colored transparent shield, a housing, a base, and an angle adjustment knob wherein the horizontal image displayed on the fluorescent display lamp is double-refracted by said transmissive lens and projected onto the windshield through said colored film and then reflected to form into the correct image;

a function control box connecting to said projection display via a control function line for transferring the control signal to said counting circuit device, said function control box having a control panel with touch control keys for setting the contents of the informations to be displayed; and a light colored transparent displaying film having coated with hydrogel for displaying the image while preventing double images and the interference by the light rays coming from outside the vehicle.

2. A vehicle head-up display according to claim 1, wherein the vehicle is an automobile.

3. A vehicle head-up display according to claim 1, wherein said fluorescent display is a displaying lamp having a brightness of at least 600 lux.

4. A vehicle head-up display according to claim 1, wherein said angle adjustment knob can adjust said projection display in the front, rear, up, and down directions.

5. A vehicle head-up display according to claim 1, wherein said counting circuit device can calculate instant information values of the rpm, time, fuel level, temperature, and humidity which are to be displayed.

6. A vehicle head-up display according to claim 1, further comprising:
   a thin, light colored transparent displaying board secured above said projection display for preventing the occurrence of double images and the interfering light rays coming from outside the car.

7. A vehicle head-up display according to claim 1, wherein the vehicle is a motorcycle.

8. A vehicle head-up display according to claim 7, further comprising:
   a signal converter for transmitting the magnetic signal representing the speed, in wired manner, to a signal receiver provided on a safety helmet; and
   a thick, transparent windshield shade provided on said helmet for direct display of the image signal projected thereon.

9. A vehicle head-up display according to claim 8, wherein the magnetic signal transmitted by the signal converter is in wireless manner.

* * * * *